United States Patent
Sada et al.

[19]

[11] Patent Number: 6,133,715
[45] Date of Patent: Oct. 17, 2000

[54] POWER SOURCE SYSTEM FOR VEHICLE

[75] Inventors: Takeshi Sada, Kariya; Toshinori Maruyama, Anjo, both of Japan

[73] Assignee: Denso Corporation, Kariya, Japan

[21] Appl. No.: 09/200,597

[22] Filed: Nov. 27, 1998

[30] Foreign Application Priority Data

Nov. 28, 1997 [JP] Japan .................................. 9-327592

[51] Int. Cl.$^7$ ...................................................... H02P 9/44
[52] U.S. Cl. ................................................. 322/28; 322/29
[58] Field of Search .............................. 320/5; 322/25, 322/27, 28, 29

[56] References Cited

U.S. PATENT DOCUMENTS

| | | | |
|---|---|---|---|
| 4,379,990 | 4/1983 | Sivers et al. | 322/99 |
| 4,739,244 | 4/1988 | Komurasaki et al. | 322/29 |
| 5,280,231 | 1/1994 | Kato et al. | 320/31 |
| 5,352,971 | 10/1994 | Nishimura | 322/27 |
| 5,467,008 | 11/1995 | Uchinami | 322/27 |
| 5,608,310 | 4/1997 | Watanabe | 322/29 |
| 5,621,300 | 4/1997 | Sato et al. | 320/5 |
| 5,929,609 | 7/1999 | Joy et al. | 322/25 |

FOREIGN PATENT DOCUMENTS

| | | |
|---|---|---|
| 59-59099 | 4/1984 | Japan . |
| 4-17600 | 1/1992 | Japan . |
| 5-300668 | 11/1993 | Japan . |
| 6-189600 | 7/1994 | Japan . |

*Primary Examiner*—Nicholas Ponomarenko
*Attorney, Agent, or Firm*—Pillsbury Madison & Sutro LLP

[57] ABSTRACT

A power source system is composed of a generator, a running-condition sensing-unit, a power control unit which controls generator output voltage according to vehicle running condition, and a constant voltage source connected in series with the generator and a vehicle load. The constant voltage source supplies the vehicle load with power at a constant voltage lower than the output voltage of the generator.

12 Claims, 4 Drawing Sheets

POWER SOURCE SYSTEM FOR VEHICLE

CROSS REFERENCE TO RELATED APPLICATION

The present application is based on and claims priority from Japanese Patent Applications Hei 9-327592 filed on Nov. 28, 1997, the contents of which are incorporated herein by reference.

BACKGROUND OF THE INVENTION

1. Field of the Invention

The present invention relates to a power source system for a vehicle which has a generator and a power control unit.

2. Description of the Related Art

When a vehicle equipped with a generator runs uphill or increase the speed, sufficient driving power can not be provided without pressing the accelerator pedal or shifting down the transmission gear. This is an obstacle to improve fuel consumption and drivability.

JP-A-5-300668 proposes a system, in which the operation of a generator is stopped when a vehicle runs uphill to improve fuel consumption and drivability.

However, when the operation of the generator is stopped, the voltage applied to various electric loads, such as head lamps and a blower motor for an air conditioner, decreases. This dims the head lamps and reduces quantity of the cooling air.

SUMMARY OF THE INVENTION

A main object of the invention is to provide an improved power source system that is effective to improve the fuel consumption and drivability without above stated problems.

According to the main aspect of the invention, a power source system is composed of a generator, a running-condition sensing-unit, a power control unit for controlling output voltage of the generator according to the vehicle running condition, and a constant voltage source for supplying the vehicle load with power at a constant voltage lower than the output voltage of the generator.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A power source system according to a first embodiment of the invention is described with reference to FIGS. 1 and 2.

Figure 1:
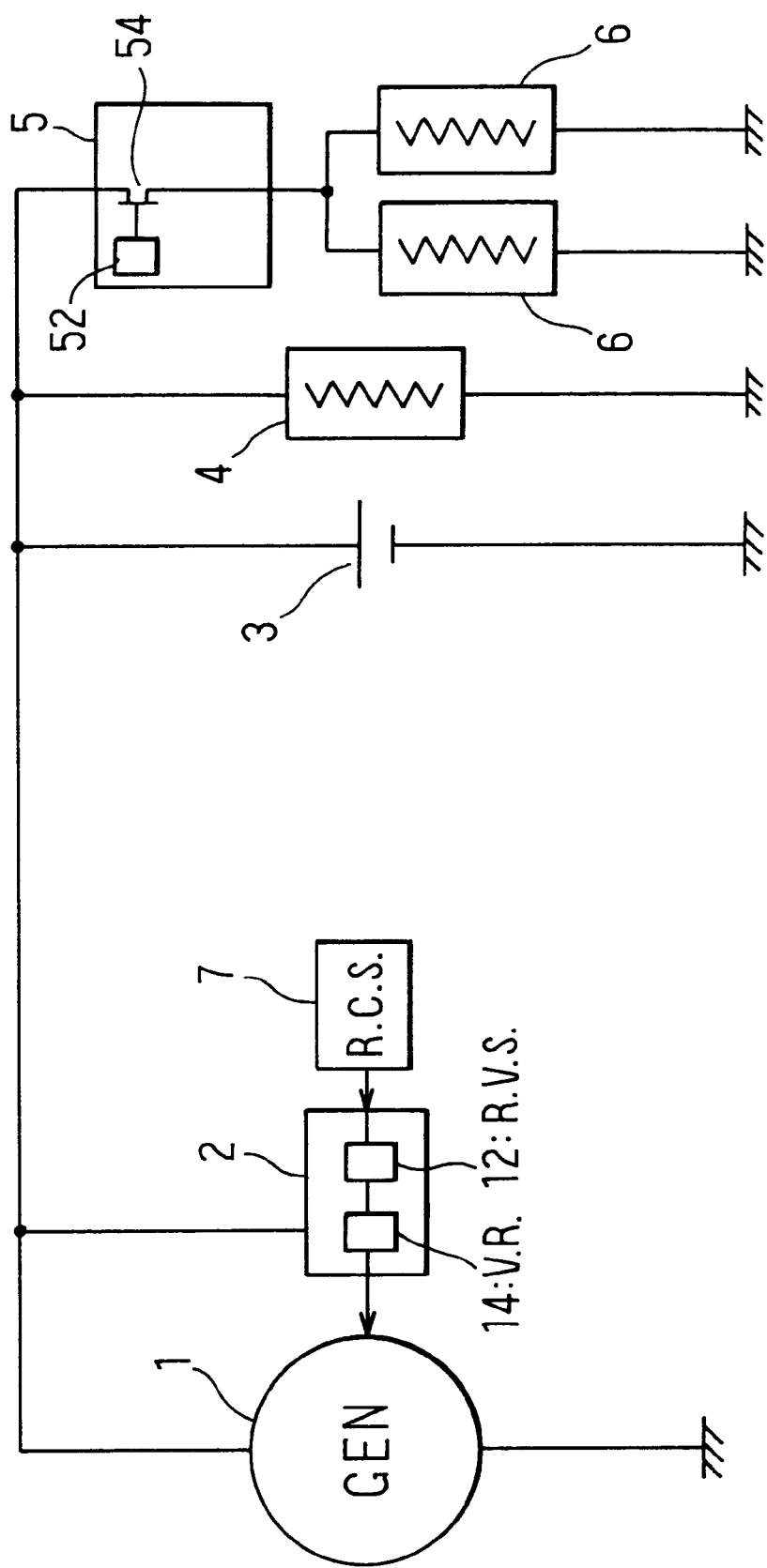
FIG. 1 is a schematic diagram of a power source system according to a first embodiment of the invention.

In FIG. 1, a power source system is composed of generator 1, power control unit 2, battery 3, first electric load 4, constant voltage source 5, second electric loads 6, and running condition sensing unit 7. Generator 1 has a grounded terminal and a high-side terminal connected to battery 3, and is driven by an engine (not shown). The high-side terminal is connected to first electric load 4 and, through constant voltage source, to second electric loads 6. Constant voltage source 5 is composed of switching element 54 and a control circuit 52 for controlling the conductivity of switching element 54, and provides a constant voltage. In other words, second electric loads 6 include the head lamps and the blower motor that need constant voltage source.

Figure 2:
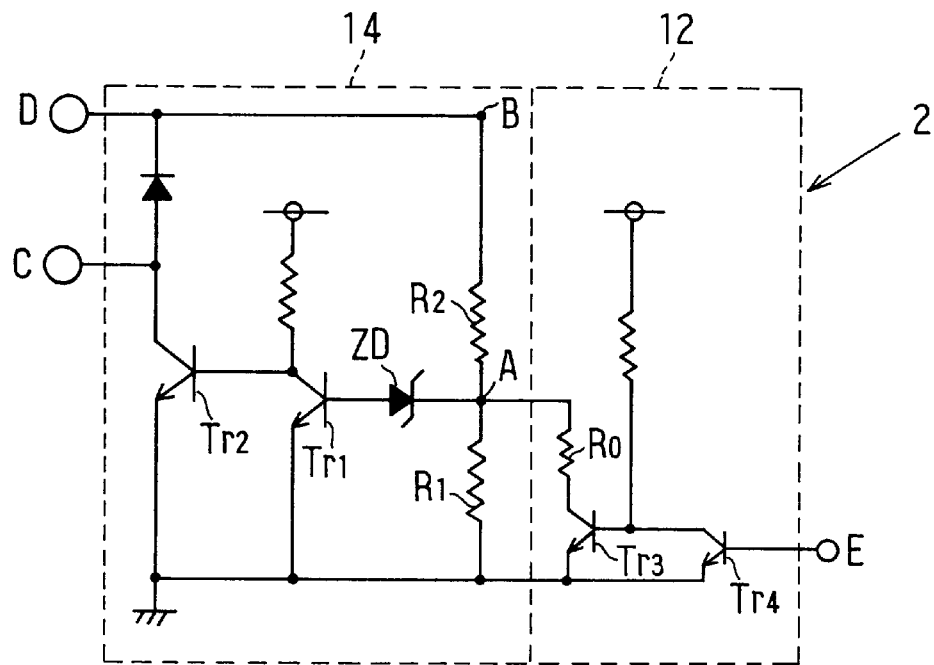
FIG. 2 is a circuit diagram of a power control unit of the power source system according to the first embodiment.

Power control unit 2 is composed of voltage setting unit 12 and voltage regulator 14 as shown in FIG. 2. Power control unit 2 regulates the output voltage of generator 1 according to vehicle running condition. The vehicle running condition is detected by running-condition sensing-unit 7, which includes a vehicle acceleration sensor.

When the engine starts, generator 1 is driven by the engine and generates output power when field current is supplied by power control unit 2. Reference-voltage setting-unit 12 provides first and second reference voltages that are higher than the voltage applied to second electric loads 6. First reference voltage is set higher than second reference voltage. Voltage regulator 14 regulates the output voltage of the generator according to the first reference voltage in the ordinary operation.

When running-condition sensing-unit 7 detects an acceleration of the vehicle, it sends reference-voltage setting-unit 12 a signal to change the first reference voltage to the second reference voltage so that the output voltage of generator 1 can be regulated lower than the output voltage in the ordinary operation. However, the head lamps are prevented from dimming and the blower motor can supply a constant quantity of cooling air because of constant voltage source 5 that always supplies constant voltage lower than the output voltage of generator.

Voltage regulator 14 of power control unit 2 has terminal D and terminal C connected to a field coil (not shown) of generator 1. Terminal D is connected to the high-side terminal of generator 1 so that the generator output voltage Vb can be applied to portion B and divided by resistors R0, R1 and R2. Thus voltage Va is provided on portion A. Reference-voltage setting-unit 12 has input terminal E to receive signals from running-condition-sensing unit 7 so that transistor Tr4 can be turned on when an acceleration of the vehicle is detected.

Transistor Tr4 is turned off to keep transistor Tr3 turning on while an acceleration is not detected, so that resistors R0 and R1 can be connected in parallel with each other. When the output voltage of generator 1 is not high to break down Zener diode ZD, Transistor Tr1 is turned off to turn on transistor Tr2. Thus, the field coil is excited, and generator 1 generates output voltage. When the output voltage becomes voltage Vb1 to make Zener diode ZD conductive, transistor Tr1 is turned on to turn off transistor Tr2, thereby controlling generation. This voltage Vb1 corresponds to the first reference voltage.

When running-condition-sensing unit 7 detects an acceleration, transistor Tr4 is turned on to turn off transistor Tr3 so that only resistor R1 can be connected in series with resistor R2. That is, Zener diode ZD becomes conductive when the output voltage becomes voltage Vb2 that is lower than voltage Vb1 and corresponds to the second reference voltage. Thus, the output power of generator 1 is reduced when vehicle accelerates.

Power source systems according to second, third, fourth and fifth embodiments are described with reference to FIGS. 3–6, where the same reference number denotes substantially the same part or portion as the power source system according to the first embodiment.

Figure 3:
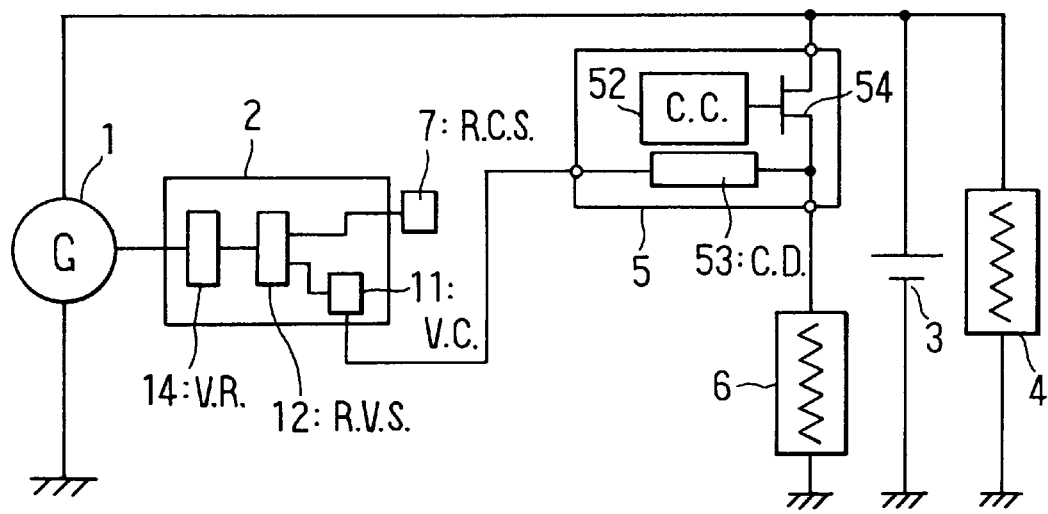
FIG. 3 is a schematic diagram of a power source system according to a second embodiment of the invention.

In FIG. 3, constant voltage source 5 of a power source system according to a second embodiment has conductivity detection circuit 53 in addition to switching element 54 and control circuit 52. Power control unit 2 has reference-voltage changing-circuit 11 in addition to reference-voltage setting-unit 12 and voltage regulator 14.

Conductivity detection circuit 53 detects a conductivity of switching element 54 and sends a conductivity signal to reference-voltage changing-circuit 11. Reference-voltage changing-circuit 11 reduces the reference voltage of reference-voltage setting-unit 12 by a predetermined value repeatedly so that the conductivity becomes 100%.

Figure 4:
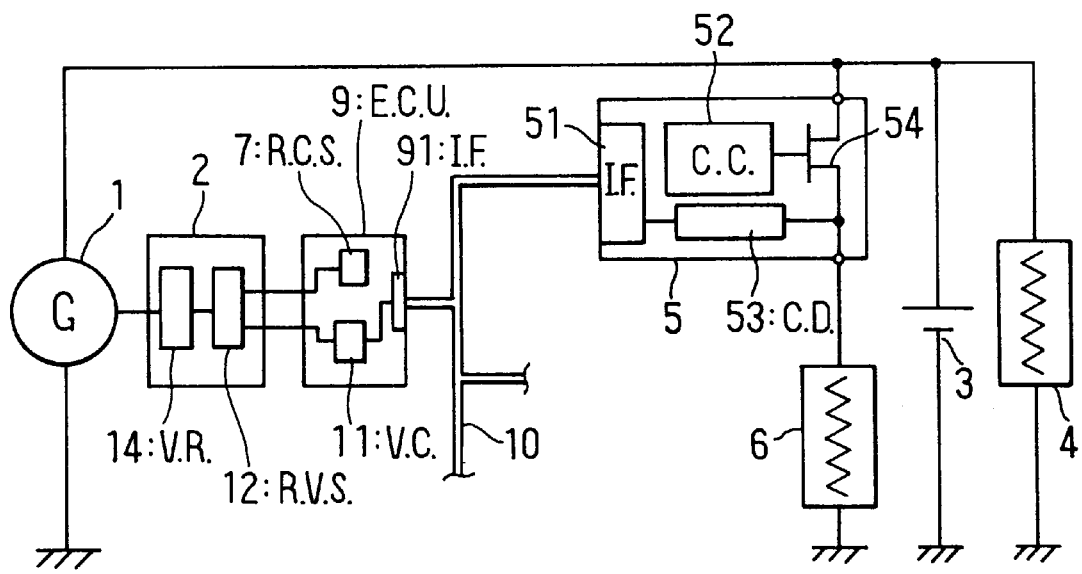
FIG. 4 is schematic diagram of a power source system according to a third embodiment of the invention.

In FIG. 4, power source system according to a third embodiment of the invention is combined with engine control unit 9 for controlling engine separately. Engine control unit 9 includes, in addition to running-condition sensing unit 7 and reference-voltage changing-circuit 11, interface 91 connected to reference-voltage changing-circuit 11. Constant voltage source 5 also includes interface 51 connected to interface 91 by LAN cable 10.

When running-condition sensing-unit 7 detects an acceleration, reference-voltage setting-unit 12 changes the first reference voltage to the second reference voltage. Thereafter, conductivity detection circuit 53 detects the conductivity of switching element 54 and sends a detection signal to reference-voltage changing-circuit 11 by LAN cable 10. If the conductivity is less than 100%, reference-voltage changing-circuit 11 controls reference-voltage setting-unit 12 to reduce the reference voltage by a certain value. Because reference-voltage changing-circuit 11 is included in engine control unit 9, the operation thereof can be changed easily by changing the engine control program.

Figure 5:
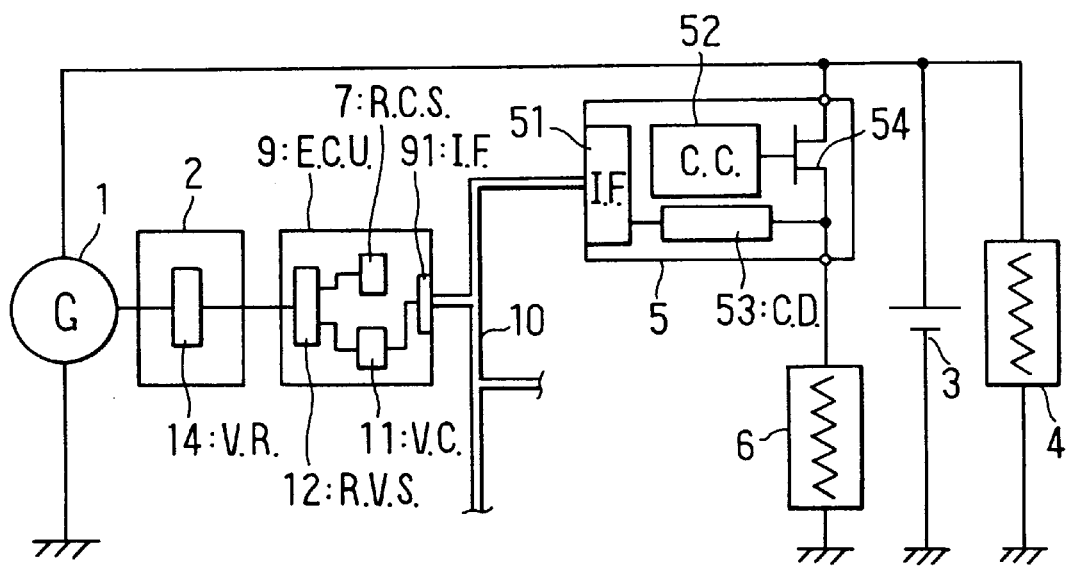
FIG. 5 is schematic diagram of a power source system according to a fourth embodiment of the invention.

In FIG. 5, reference-voltage setting-unit 12 of power source system according to a fourth embodiment is located at engine control unit 9 in addition to running-condition sensing unit 7 and reference-voltage changing-circuit 11, to change the operation more easily.

Figure 6:
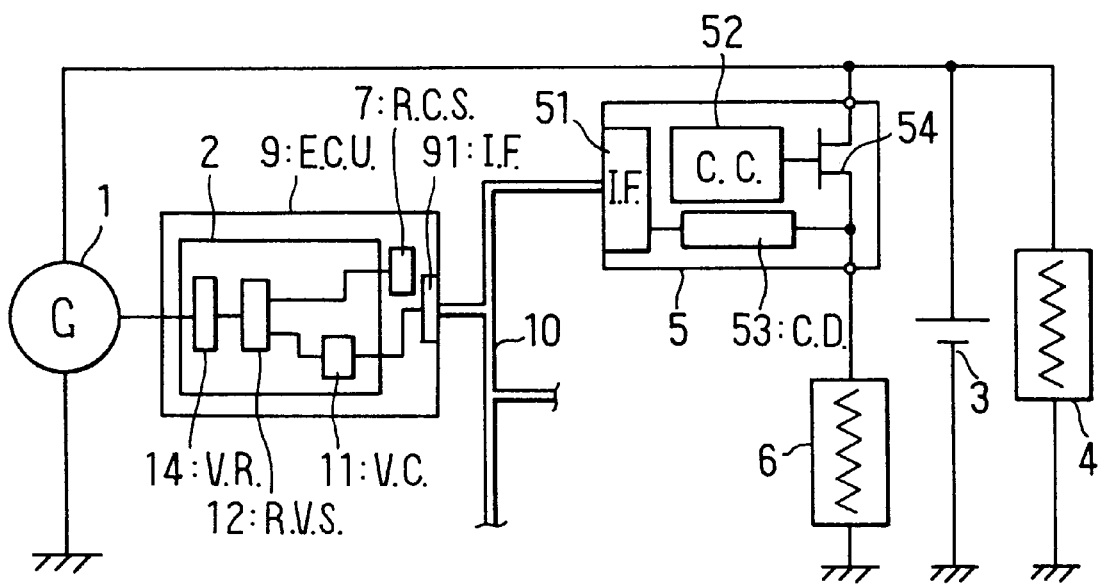
FIG. 6 is schematic diagram of a power source system according to a fifth embodiment of the invention.

Power source system according to a fifth embodiment in FIG. 6. The entire portion of power control unit 2 that is composed of reference-voltage changing-circuit 11, reference-voltage setting-unit 12, and voltage regulator 14 is located in engine control unit 9 to provide a generator 1 without electronic circuits therein.

Acceleration sensor of running-condition sensing-unit 7 can be substituted by a throttle angle sensor or the like.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A power source system for a vehicle load and a vehicle battery comprising:

a generator for generating output power;

a running-condition sensing-unit for detecting vehicle running condition;

a power control unit, connected between said generator and said running-condition sensing-unit, for controlling output voltage of said generator according to said vehicle running condition; and a constant voltage source having an input terminal connected to said generator and output terminal connected to said vehicle load, said constant voltage source supplying said vehicle load with power at a constant voltage lower than said output voltage of said generator.

2. The power source system as claimed in claim 1, wherein said vehicle load supplied by said constant voltage source is a plurality of head lamps.

3. The power source system as claimed in claim 1, wherein said vehicle load supplied by said constant voltage source is a blower motor.

4. The power source system as claimed in claim 1, wherein said power control unit controls said generator to generate output power at a first output voltage when said running-condition sensing-unit detects normal condition and at a second output voltage lower than said first output voltage when said running-condition sensing-unit detects an acceleration of the vehicle.

5. The power source system as claimed in claim 1, wherein said constant voltage source comprises a switching element, a control circuit for controlling conductivity of said switching element.

6. The power source system as claimed in claim 5, wherein said constant voltage source further comprises a conductivity detection circuit, connected to said power control unit, for controlling said power control unit to reduce said output voltage when said conductivity is less than 100% until the conductivity of said switching element becomes 100%.

7. The power source system as claimed in claim 6, wherein said power control unit comprises a reference-voltage setting-unit, a voltage regulator for regulating output voltage of said generator according to the reference voltage provided by said reference-voltage setting-unit and a reference-voltage changing-circuit, connected to said conductivity detection circuit, for changing said reference voltage according to said conductivity.

8. The power source system as claimed in claim 7 used with an engine control unit, wherein said running-condition sensing-unit is included in said engine control unit.

9. The power source system as claimed in claim 8, wherein said reference-voltage changing-circuit is included in said engine control unit.

10. The power source system as claimed in claim 9, wherein said reference-voltage setting-unit is included in said engine control unit.

11. The power source system as claimed in claim 8, wherein said power control unit is included in said engine control unit.

12. The power source system as claimed in claim 6, wherein said conductivity detection circuit is connected to said power control unit by a LAN cable.

* * * * *